US007607468B2

(12) United States Patent
Yamamoto et al.

(10) Patent No.: US 7,607,468 B2

(45) Date of Patent: Oct. 27, 2009

(54) TAPE PRINTER

(75) Inventors: Tsuyoshi Yamamoto, Nagoya (JP); Yusuke Ota, Nagoya (JP); Satoru Moriyama, Iwakura (JP); Jun Jiang, Nagoya (JP); Hirotsugu Unotoro, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 463 days.

(21) Appl. No.: 11/038,543

(22) Filed: Jan. 21, 2005

(65) Prior Publication Data

US 2005/0230051 A1 Oct. 20, 2005

(30) Foreign Application Priority Data

Mar. 31, 2004 (JP) ............................ 2004-107057

(51) Int. Cl.
*B32B 15/00* (2006.01)

(52) U.S. Cl. ....................... 156/543; 156/361; 156/384; 156/387; 156/363; 221/10; 400/282; 400/579; 400/582

(58) Field of Classification Search ....................... None
See application file for complete search history.

(56) References Cited

U.S. PATENT DOCUMENTS

| | | | | | |
|---|---|---|---|---|---|
| 4,485,982 | A | * | 12/1984 | St. John et al. | 242/563.1 |
| 4,888,717 | A | * | 12/1989 | Ditto et al. | 700/302 |
| 5,000,812 | A | * | 3/1991 | Murphy | 156/268 |
| 5,816,721 | A | * | 10/1998 | Palmer et al. | 400/582 |
| 5,980,142 | A | | 11/1999 | Inui | |
| 6,172,688 | B1 | * | 1/2001 | Iwasaki et al. | 347/2 |
| 7,021,214 | B2 | * | 4/2006 | Kugo et al. | 101/485 |

FOREIGN PATENT DOCUMENTS

JP A 2002-086823 3/2002

* cited by examiner

*Primary Examiner*—Philip C Tucker
*Assistant Examiner*—Kimberly K McClelland
(74) *Attorney, Agent, or Firm*—Oliff & Berridge, PLC

(57) ABSTRACT

In the case the die cut label sheet is mounted, by detection of threshold voltage of output signal of the photo sensor, each label provisionally adhered to a front surface of the die cut label sheet is fed to a print start position. In the case the unfixed-length roll sheet is mounted, if the feeding speed is less than 40 mm/sec, by detection of threshold voltage of output signal of the photo sensor, the feeding state of unfixed-length roll sheet is judged, or if the feeding speed is not less than 40 mm/sec, on the basis of voltage change for the predetermined potential difference portion of output signal of the photo sensor, the feeding state of unfixed-length roll sheet is judged.

14 Claims, 11 Drawing Sheets

FIG.8

75

| | | LENGTH OF BLACK PORTION OF ENCODER MARK (mm) | | | | |
|---|---|---|---|---|---|---|
| | | 5 | 10 | 15 | 20 | 25 |
| FEEDING SPEED (mm/sec.) | 100 | 1.00 | 1.25 | 1.50 | 1.75 | 2.00 |
| | 80 | 1.50 | 1.75 | 2.00 | 2.50 | 2.50 |
| | 60 | 2.00 | 2.25 | 2.50 | 2.50 | 2.50 |
| | 40 | 2.25 | 2.50 | 2.50 | 2.50 | 2.50 |
| | 20 | 2.50 | 2.50 | 2.50 | 2.50 | 2.50 |

(UNIT : V)

TAPE PRINTER

BACKGROUND OF THE INVENTION

1. Field of the Invention

The present invention relates to a tape printer including a printing device for printing on a roll sheet wound on a cylindrical sheet core while feeding the roll sheet by means of a feeing device.

2. Description of Related Art

Hitherto, various tape printers have been proposed for printing characters or the like on a long roll sheet of tacky sheet with release sheet by way of a thermal head.

For example, there are provided a tape printer comprising a feeding device for feeding a long roll sheet wound on a cylindrical core, and printing device for printing on the roll sheet. The tape printer further comprises, a detector for detecting encoder marks formed at predetermined pitch on the back surface of the roll sheet and issuing a predetermined detection signal, a detecting device for detecting each feeding amount of the roll sheet in forward and backward direction, memory device for storing margin from the leading end of the roll sheet to a print start position (the margin includes a pre-feed amount to be fed preliminarily and a post-feed amount to be fed later); and a control device for controlling to determine the print start position by feeding the post-feed amount on the basis of the detection signal issued from the detector after feeding by the pre-feed amount (for example, see Japanese patent application laid-open No. 2002-86823).

In the tape printer having such configuration, encoder marks are formed at predetermined pitch on the back surface of the roll sheet. The tape printer further comprises a detector for detecting the encoder marks and issuing a predetermined detection signal, and detecting device for detecting each feeding amount of the roll sheet in forward and backward direction. Further, the tape printer, with its control device, feeds the pre-feed amount to be fed preliminarily out of the margin from the leading end of the roll sheet to a print start position, and determines the print start position by feeding the post-feed amount out of the margin on the basis of the detection signal issued from the detector. Hence the margin from the leading end of the roll sheet to the print start position is the sum of pre-feed amount and post-feed amount, and it is not necessary to feed and cut off extra portion, and the length of margin region can be shortened by shortening the pre-feed amount and post-feed amount, so that the running cost of the roll sheet can be saved.

SUMMARY OF THE INVENTION

In this conventional tape printer, however, the waveform of output signal issued from the detector for detecting encoder marks formed on the back surface of roll sheet is generally a square wave composed of predetermined high level voltage and predetermined low level voltage. But when the feeding speed of the roll sheet is increased, the waveform of output signal issued from the detector is deformed to be sawtooth wave, not descending from the predetermined high level voltage to predetermined low level voltage, and the encoder marks can not be detected.

Further, in the case of changing the feeding speed of the roll sheet according to the kind of roll sheet, when threshold voltage is fixed at the voltage between predetermined high level voltage and predetermined low level voltage on the basis of the feeding speed of a roll sheet of one kind, if the feeding speed is fast, the output signal of the detector may not descend from the predetermined high level voltage to predetermined low level voltage, and the encoder mark formed on a roll sheet of other type may not be detected.

The present invention has been made in view of the above circumstances and has an object to overcome the above problems and to provide a tape printer capable of surely detecting encoder marks formed on roll sheets of various kinds by a single mark detection sensor when the feeding speed of roll sheet is changed corresponding to the kind of the mounted roll sheet.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a tape printer comprising a feeding device for pulling out and feeding a long roll sheet wound in a rolled state so that a back surface is outside, the roll sheet having encoder marks formed at predetermined pitch on the back surface, and a printing device for printing on the roll sheet being fed by the feeding device, wherein the roll sheet is one of: a die cut label sheet having plural labels provisionally adhered to a front surface of a long release sheet arranged along the longitudinal direction of the release sheet, and an unfixed-length roll sheet formed by winding a long continuous printing medium; the tape printer further comprises: a mark detection sensor for detecting the encoder marks and issuing an output signal of predetermined voltage, sheet discrimination sensors for detecting the kind of the roll sheet, and a control circuit for controlling the feeding device on the basis of the output signal issued from the mark detection sensor; and the control circuit includes: an output voltage storage section preliminarily storing predetermined output voltage of the mark detection sensor corresponding to each combination of length of plural kinds of encoder marks in a feeding direction and feeding speed of plural kinds of roll sheet, and a processor for executing a kind determining process for determining the kind of the roll sheet detected by the sheet discrimination sensors, a feeding process for feeding the label of the die cut label sheet to a print start position on the basis of the output voltage of the mark detection sensor in the case where the roll sheet is the die cut label sheet, and a feeding state checking process for judging a feeding state of the unfixed-length roll sheet based on the output voltage of the mark detection sensor in the case where the roll sheet is the unfixed-length roll sheet.

In this tape printer, in the case of roll sheet of die cut label sheet having plural labels arrayed and provisionally adhered to the surface side of long release sheet along the longitudinal direction of the release sheet, the label of die cut label sheet is fed to the print start position on the basis of the output voltage of mark detection sensor, and the feeding state of unfixed-length roll sheet is judged on the basis of the output voltage of the mark detection sensor in the case the roll sheet is an unfixed-length roll sheet on which a long and continuous medium to be printed is wound. Hence, by a same mark detection sensor, the encoder marks of rolls sheets of various kinds can be securely detected, and in the case of die cut label sheet, the label of the die cut label sheet can be fed to the print start position, or in the case of unfixed-length roll sheet, the feeding state of the unfixed-length roll sheet can be judged accurately.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 8 shows an example of a mark length output voltage table stored in a mark length output voltage table storage area in a ROM in the tape printer in the embodiment;

DETAILED DESCRIPTION OF THE PREFERRED EMBODIMENTS

A detailed description of a preferred embodiment of a tape printer embodying the present invention will now be given referring to the accompanying drawings.

A structure of the tape printer in the present embodiment is roughly explained below with reference to FIGS. 1 through 5.

Figure 1:
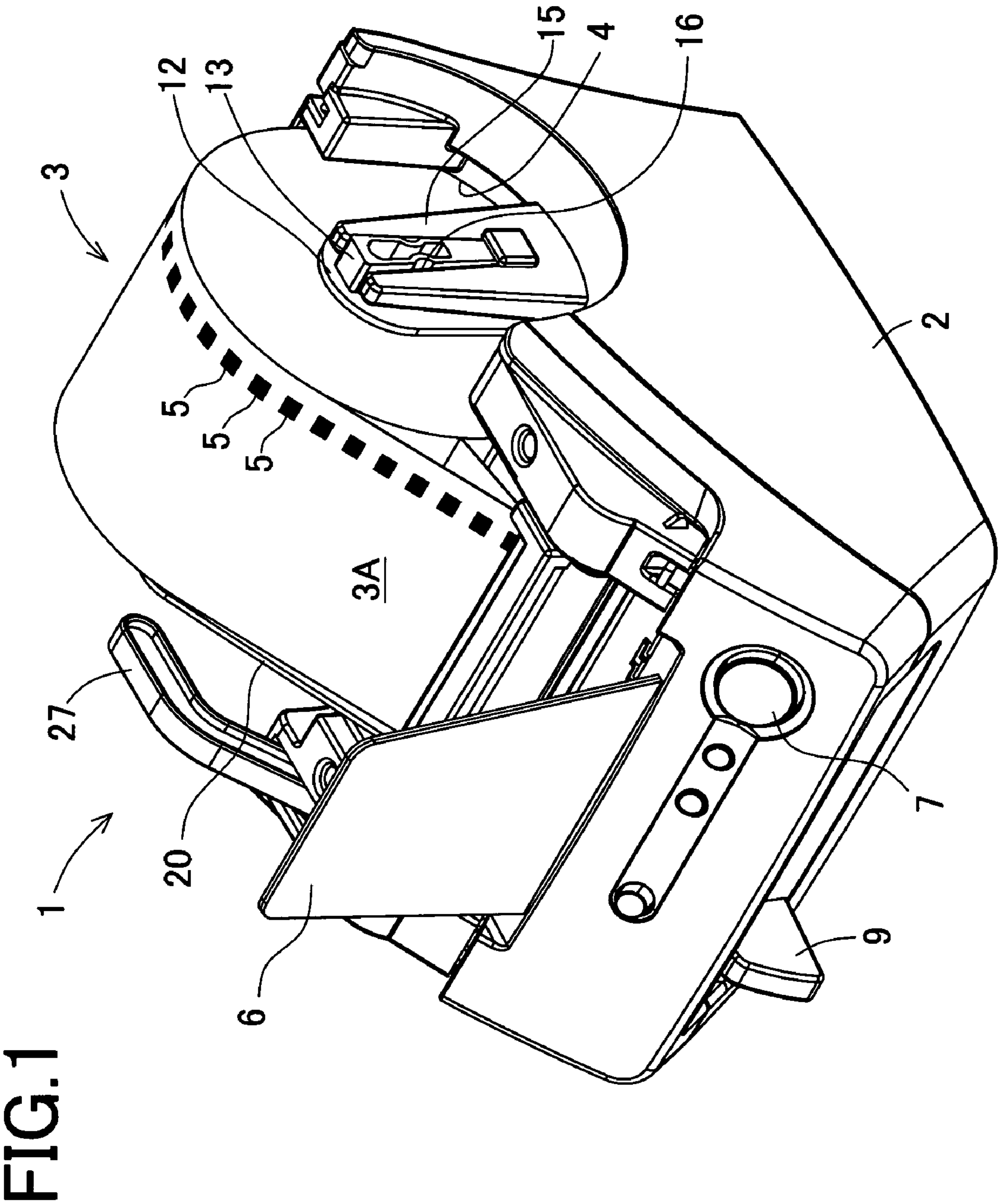
FIG. 1 is a schematic perspective view of a tape printer in a preferred embodiment, showing a state where a top cover is removed and an unfixed-length roll sheet of a maximum width is mounted.
Figure 2:
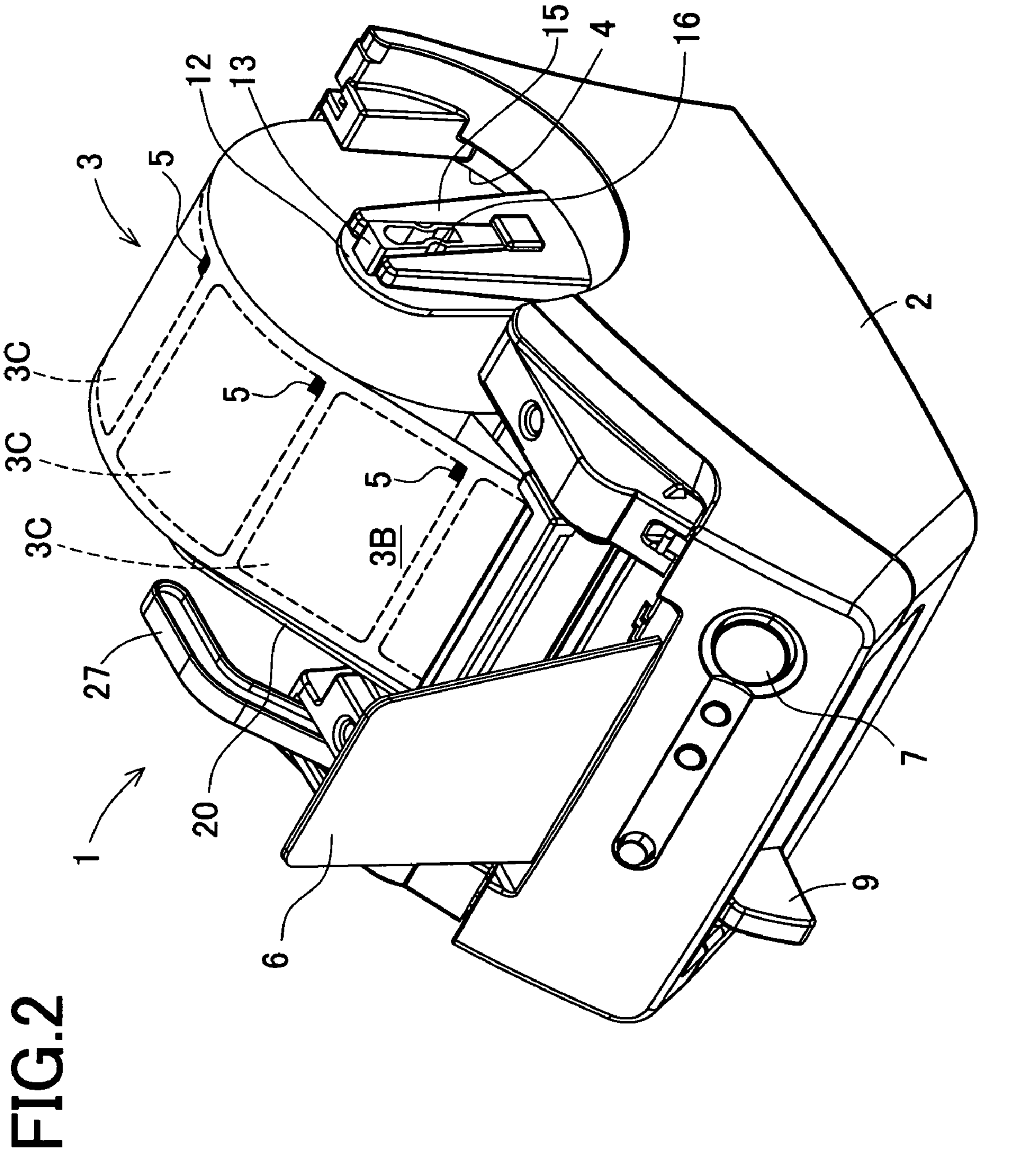
FIG. 2 is a schematic perspective view of the tape printer in the preferred embodiment, showing a state where the top cover is removed and a die cut label sheet of a maximum width is mounted.
Figure 3A:
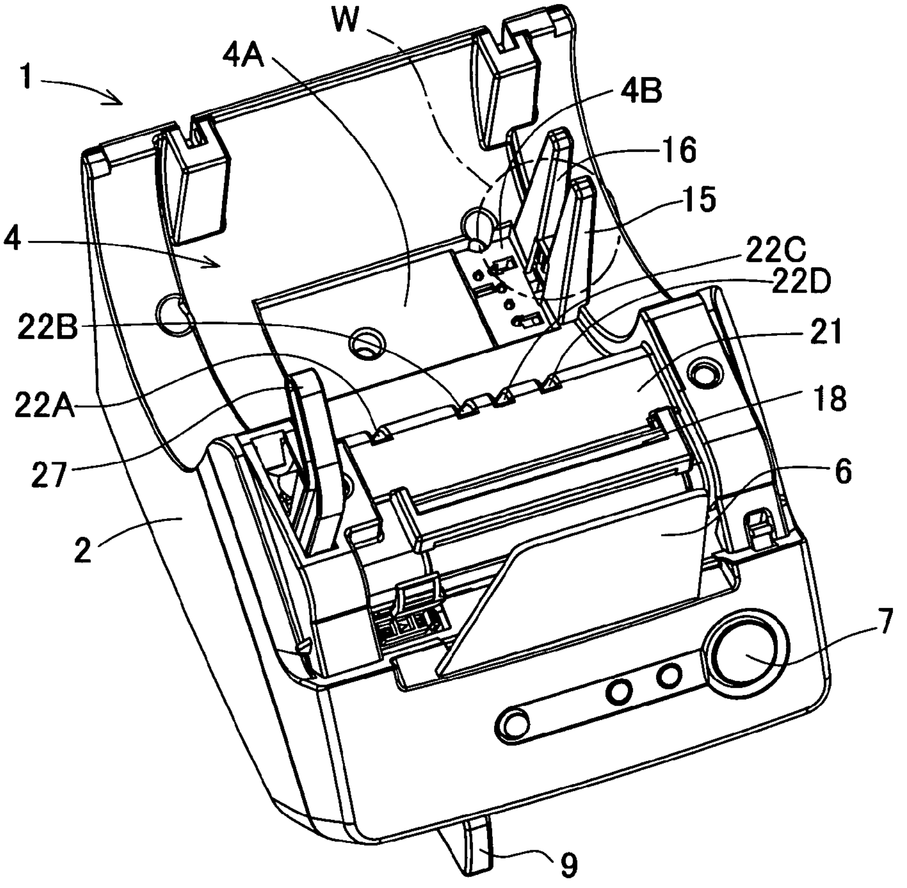
FIG. 3A is a schematic perspective view of the tape printer in the preferred embodiment, showing a state where the top cover is removed.
Figure 3B:
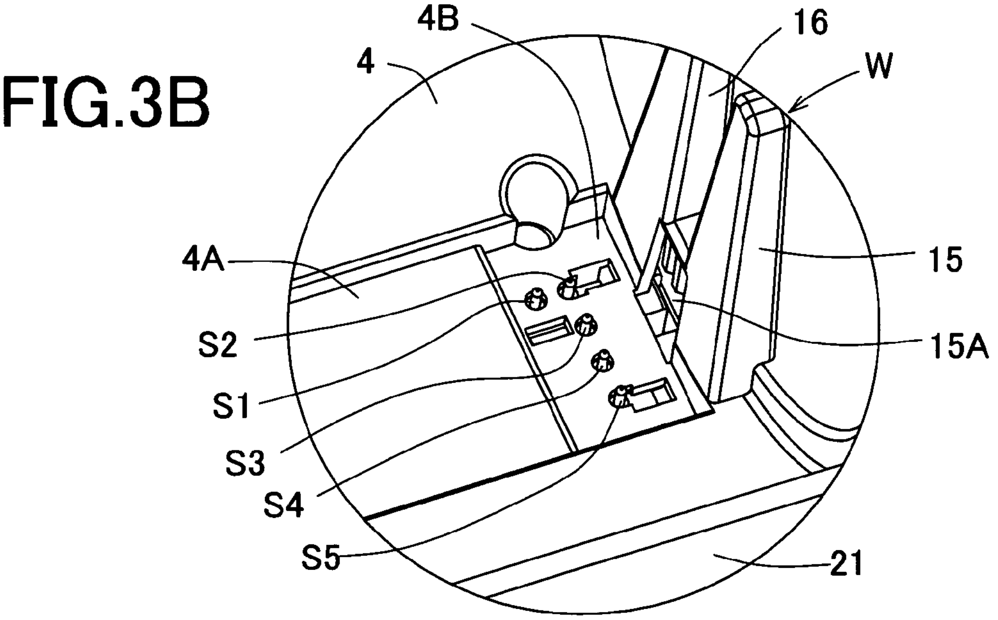
FIG. 3B is an enlarged perspective view of a portion indicated by a dashed circle W in FIG. 3A.

As shown in FIGS. 1 and 2, the tape printer 1 includes a housing 2, a top cover not shown made of transparent resin attached to the housing 2 at a rear upper edge, a tray 6 made of transparent resin set in a vertical position to face a substantially front center of the top cover, a power button 7 placed in front of the tray 6, a cutter lever 9 provided in a front face of the housing 2, and others. The top cover is freely opened and closed, thereby covering an upper part of a roll sheet holder storage part (hereinafter, a "holder storage part") 4 which is a space for receiving a roll sheet holder 3 holding a roll sheet 3A of an un-fixed length and a predetermined width or a die cut label sheet 3B of a predetermined width. The cutter lever 9 is movable side to side to horizontally move a cutter unit 8 (see FIG. 4). A power cord 10 (see FIG. 4) is connected to the housing 2 on a back face near a corner. The housing 2 is provided on the back face near the other corner with a connector part (not shown) such as a USB (Universal Serial Bus) which is connected to for example a personal computer not shown.

The unfixed-length roll sheet 3A is formed of a long thermal sheet (so-called "thermal paper") having a self color development property or a long thermal sheet whose one surface has an adhesive layer that is covered by a release sheet. This roll sheet 3A is in a wound state around a cylindrical sheet core so that the back surface of the release sheet is outside. On the back surface of the roll sheet 3A, encoder marks 5 are provided to be spaced at a predetermined pitch apart (for example, at a 10-mm pitch, 20-mm pitch, or 30-mm pitch) so that each encoder mark 5 comes to a position facing a photo-sensor 11 serving as a mark detection sensor mentioned later. Each encoder mark 5 is formed to have a width in a feeding direction which is half the predetermined pitch.

The die cut label sheet 3B is formed of labels 3C made of a thermal sheet (so-called "thermal paper") having a self color development property, each label 3C being provisionally adhered to the front surface of a long release sheet by adhesive and arranged in a longitudinal direction. The die cut label sheet 3B is in a wound state around a cylindrical sheet core so that the back surface of the release sheet is outside. On the back surface of the die cut label sheet 3B, i.e., the back surface of the release sheet, an encoder mark 5 is provided in each label 3C at a forward corner in the feeding direction so that each encoder mark 5 comes to a position facing the photo-sensor 11 serving as the mark detection sensor mentioned later.

As shown in FIGS. 1 through 4, the tape printer 1 is provided with a holder support member 15 in a holder storage part 4 at a side end (a right side end in FIG. 3) in a substantially perpendicular direction to a sheet feeding direction. The holder support member 15 receives a mounting piece (a positioning rib) 13 of a positioning holding member (hereinafter, a "holding member") 12 constructing the roll sheet holder 3 mentioned later. The mounting piece 13 is provided protruding in a substantially longitudinal rectangular shape on the outer surface of the holding member 12. Specifically, the holder support member 15 is shaped like an angled U-shape as seen in side view of the printer 1, providing a first positioning groove 16 which opens upward in the tape printer 1. The holder support member 15 is also formed, at an inner base end, with a recess 15A which engages an elastic locking piece 12A (see FIG. 6) formed projecting at a lower end of the holding member 12.

Figure 4:
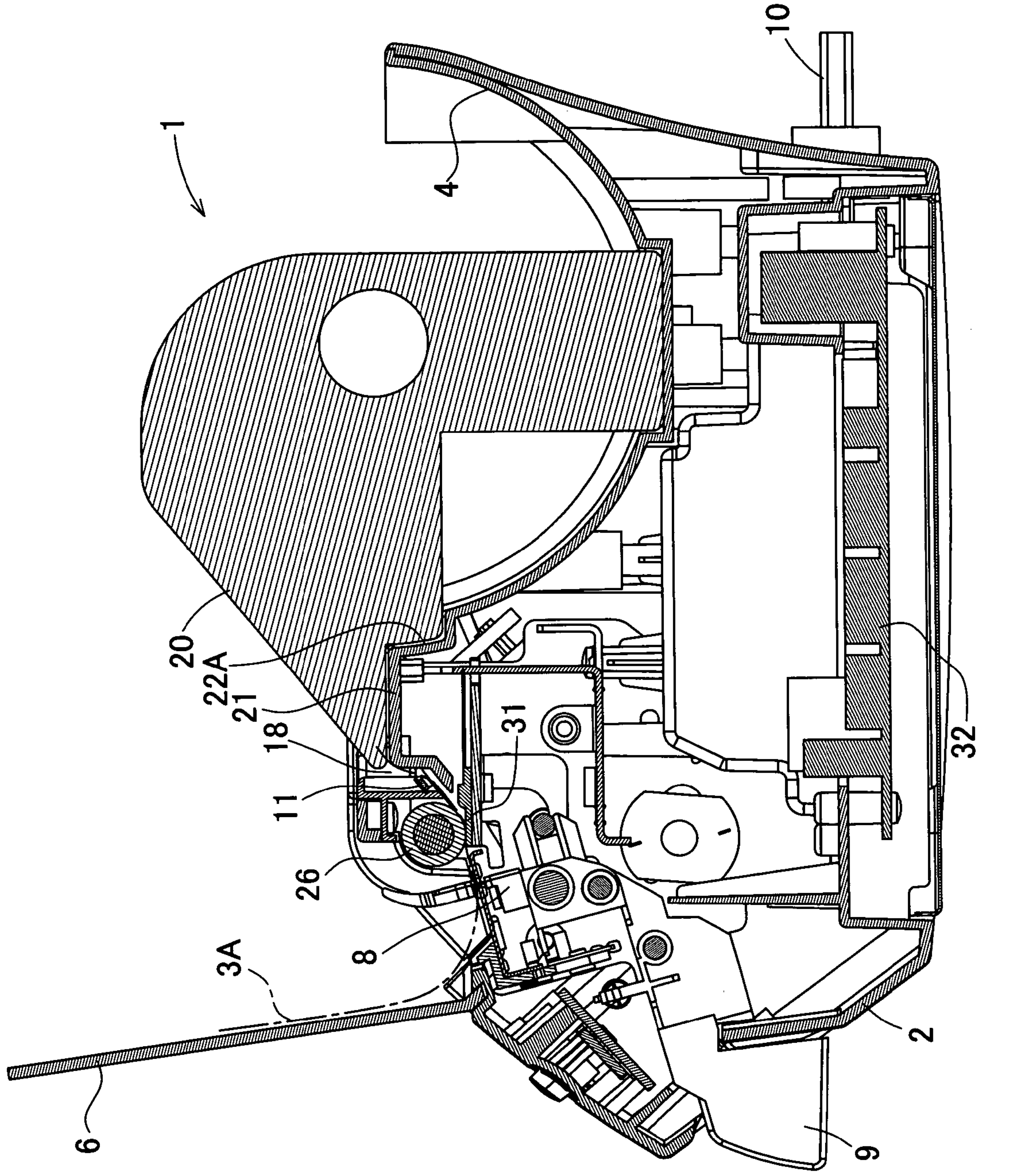
FIG. 4 is a sectional side view of the tape printer in the embodiment, showing a state where the top cover is removed and a roll sheet holder is mounted.

The housing 2 is further formed with an insertion opening 18 through which a leading end of an unwound part of the unfixed-length roll sheet 3A or die cut label sheet 3B is inserted into the housing 2. A flat portion 21 is formed substantially horizontal between a rear end (in the feeding direction) of the insertion opening 18 and a front upper edge portion of the holder storage part 4. On this flat portion 21, a front end portion of a guide member 20 of the roll sheet holder 3 is placed. The flat portion 21 is provided at a rear corner in the feeding direction with second positioning grooves (four grooves in the present embodiment) 22A to 22D each formed by a substantially L-shaped wall in section and positioned corresponding to each of a plurality of roll sheets 3A of different widths. Each of the second positioning grooves 22A to 22D is configured to fittingly receive a front part of the guide member 20 inserted from above, as shown in FIG. 4. Further, the front end of the guide member 20 of the roll sheet holder 3 extends to the insertion opening 18.

A positioning recess 4A is formed in the bottom of the holder storage part 4. The positioning recess 4A is rectangular in plan view and long sideways in a direction substantially perpendicular to the feeding direction, extending from the inner base end of the holder support member 15 to a position corresponding to the second positioning groove 22A. This positioning recess 4A has a predetermined depth (about 1.5 mm to 3.0 mm in the present embodiment). The width of the positioning recess 4A in the feeding direction is determined to be almost equal to the width of each lower end portion of the holding member 12 and the guide member 20. A discrimination recess 4B is provided between the positioning recess 4A and the inner base end of the holder support member 15. This discrimination recess 4B is rectangular in plan view, which is long in the feeding direction, and has a depth larger by a predetermined amount (about 1.5 mm to 3.0 mm in the present embodiment) than the positioning recess 4A. The discrimination recess 4B will receive a sheet discrimination part 60 (see FIG. 6) mentioned later which extends inward from the lower end of the holding member 12 at a right angle therewith.

In the discrimination recess 4B, there are provided five sheet discrimination sensors S1, S2, S3, S4, and S5 arranged in an L-shaped pattern for distinguishing a kind of the unfixed-length roll sheet 3A or die cut label sheet 3B, a material of the thermal sheet, a width of the roll sheet, a pitch of encoder marks 5 in the feeding direction. These sensors S1 to S5 are each constructed of a push type microswitch or the like, specifically, a well known mechanical switch including a plunger and a microswitch. Each plunger is placed so that an upper end thereof protrudes from the bottom surface of the discrimination recess 4B to near the bottom surface of the positioning recess 4A. It is detected whether the sheet discrimination part 60 has sensor holes (through holes) 60A to 60E (see FIG. 6), mentioned later, at the positions corresponding to the sheet discrimination sensors S1 to S5 respectively. Based on an ON/OFF signal representing a detection result by the sensors S1 to S5, a kind of the unfixed-length roll sheet 3A or die cut label sheet 3B, a material of the thermal sheet, a width of the roll sheet, a pitch of encoder marks 5 in the feeding direction are detected.

In the present embodiment, the tape discrimination sensors S1 to S5 are allowed to normally protrude from the bottom surface of the discrimination recess 4B to near the bottom surface of the positioning recess 4A, that is, at the height substantially corresponding to a depth difference between the discrimination recess 4B and the positioning recess 4A. At this time, each microswitch is in an OFF state.

In the case where the sheet discrimination part 60 has some sensor hole(s) 60A to 60E at the positions corresponding to the sheet discrimination sensors S1 to S5, the plunger(s) of the sensor(s) for which the sheet discrimination part 60 has sensor hole(s) is allowed to pass through the associated sensor holes 60A to 60E without depression, leaving the corresponding microswitch(es) in the OFF state, which generates an OFF signal. On the other hand, the plunger(s) of the sensor(s) for which the sheet discrimination part 60 has no sensor hole(s) is depressed, bringing the corresponding microswitch(es) into the ON state, which generates an ON signal. Specifically, each sensor S1 to S5 outputs a signal represented as a bit "0" or "1", In the case where all of the sensors S1 to S5 are in the OFF state, that is, in the case where the roll sheet holder 3 is not mounted in the tape printer 1, a signal of five bits "00000" is outputted.

The insertion opening 18 is arranged so that its one side end (a right end in FIG. 3) on the holder support member 15 side in the tape printer 1 is positioned substantially in one plane with the inner surface of the holder support member 15 in which the positioning groove 16 opens, more properly, in one plane with the inner surface of the positioning member 12 when engaged in the holder support member 15. In the insertion opening 18, a guide rib is formed on the side end near the holder support member 15.

A lever 27 for operating the vertical movement of a thermal head 31 (see FIG. 4) is provided in front of the other side end (a left end in FIG. 3) of the holder storage part 4 in the feeding direction. To be more specific, when the lever 27 is turned up, a thermal head 31 is moved down and separated from a platen roller 26 (see FIG. 4). When the lever 27 is turned down, to the contrary, the thermal head 31 is moved up, thereby pressing the unwound part of the unfixed-length roll sheet 3A or die cut label sheet 3B against the platen roller 26. A printable condition is thus developed. Further, below the roll sheet holder 4, there is provided a control board 32 (see FIG. 4) on which a control circuit 61 (see FIG. 7) is formed to drive and control each mechanism in response to commands from an external personal computer and others.

The roll sheet holder 3 in which the unfixed-length roll sheet 3A or die cut label sheet 3B wound on the sheet core is removably set in the holder storage part 4 in the following manner. The mounting piece 13 of the positioning member 12 is inserted from above into the first positioning groove 16 of the holder support member 15. The elastic locking piece 12A formed projecting at the lower end of the positioning member 12 is then engaged in the locking recess 15A formed in the inner base end of the holder support member 15. A front lower portion (i.e., a fourth extended portion 45 mentioned later) of the guide member 20 is engaged in appropriate one of the second positioning grooves 22A to 22D and the lower end portion of the guide member 20 is fittingly inserted in the positioning recess 4A. The sheet discrimination part 60 extending inward from the lower end of the positioning member 12 is fitted in the discrimination recess 4B. In this state, it is detected whether or not the sheet discrimination part 60 has the sensor holes 60A to 60E corresponding to the sheet discrimination sensors S1 to S5 arranged in the discrimination recess 4B. Specifically, the kind of the unfixed-length roll sheet 3A or die cut label sheet 3B held in the roll sheet holder 3, and others can be detected.

The lever 27 is turned upward and a leading end of an unwound part of the unfixed-length roll sheet 3A or die cut label sheet 3B is inserted into the insertion opening 18 while one side edge of the unwound part of the unfixed-length roll sheet 3A or die cut label sheet 3B is held in contact with the inner surface of the guide member 20 and the other side edge is held in contact with the guide rib provided at the side end of the insertion opening 18. Thereafter, the lever 27 is turned downward. Printing is thus enabled.

Figure 5:
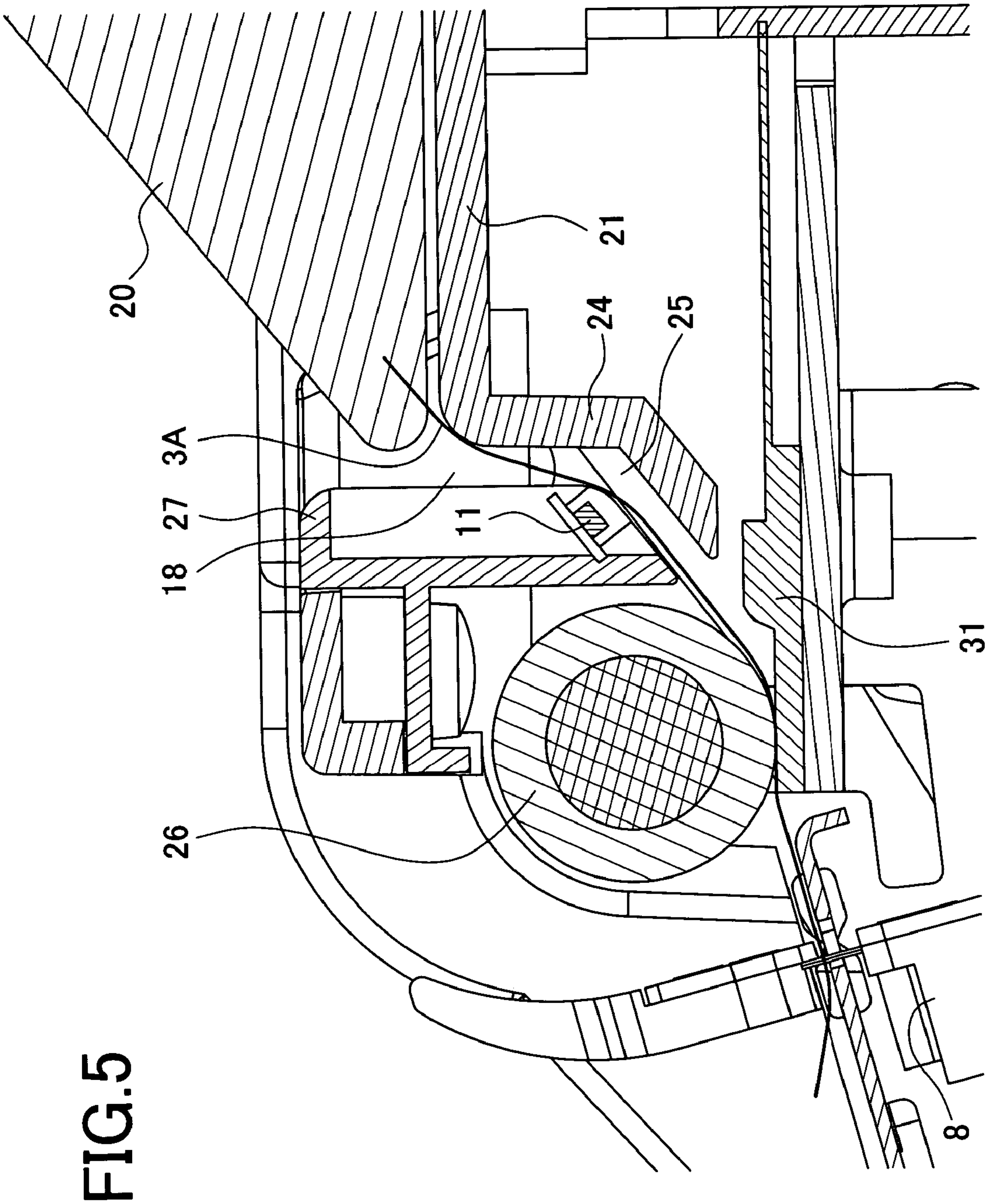
FIG. 5 is a sectional side view of an enlarged part showing a positional relationship between a platen roller of FIG. 4 and a mark detection sensor disposed upstream therefrom.

As shown in FIGS. 4 and 5, when the lever 27 is moved down, the part of the unfixed-length roll sheet 3A or die cut label sheet 3B inserted in the insertion opening 18 is pressed against the platen roller 26 by means of the thermal head 31 of a line type. The platen roller 26 is rotated by a sheet feed motor 73 (see FIG. 7) constructed of a step motor or the like while the thermal head 31 is driven and controlled to print image data on a print surface of the unfixed-length roll sheet 3A or die cut label sheet 3B which is fed sequentially. The printed part of the unfixed-length roll sheet 3A or die cut label sheet 3B discharged onto the tray 6 is cut by a cutter unit 8 when the user moves the cut lever 9 rightward.

As shown in FIG. 5, an extended portion 24 is formed extending downward in a predetermined length from a front end of the flat portion 21 on which the end of the guide member 20 is placed. The extended portion 24 has a bent end of a predetermined length to the platen roller 26 side, providing a mirror-reversed L-shape in side view. Upstream from the platen roller 26, a guide member 27 is provided leaving a predetermined clearance for the upper surface of the bent end of the extended portion 24. This clearance forms the insertion opening 18. Further, the upper surface of the bent end of the extended portion 24 and the lower end surface of the guide member 27 form a sheet guide path 25 for guiding the unfixed-length roll sheet 3A or die cut label sheet 3B to underneath the platen roller 26. Accordingly, the unfixed-length roll sheet 3A or die cut label sheet 3B having entered the insertion opening 18 is guided along the sheet guide path 25 to underneath the platen roller 26.

In the lower end surface of the guide member 27, with which back surface of the unfixed-length roll sheet 3A or die cut label sheet 3B is in contact while the sheet 3A or 3B is unreeled, the photo-sensor 11 which is a reflective photo-sensor serving as the mark detection sensor is disposed near a corner on the holder support member 15 side. This photo-sensor 11 detects each encoder mark 5 formed on the back surface of the unfixed-length roll sheet 3A or die cut label sheet 3B.

It is to be noted that the photo-sensor 11 has to be disposed to face the back surface of the unfixed-length roll sheet 3A or die cut label sheet 3B having a minimum width. With this configuration, the tape printer 1 is adaptable to any kinds of the unfixed-length roll sheet 3A or die cut label sheet 3B of different widths.

A schematic structure of the roll sheet holder 3 is explained below with reference to FIG. 6. In the same roll sheet holder 3, the unfixed-length roll sheet 3A or die cut label sheet 3B is mounted to be circumferentially rotatable. In the following description, the case where the unfixed-length roll sheet 3A (hereinafter, a "roll sheet 3A") is mounted is explained.

Figure 6A:
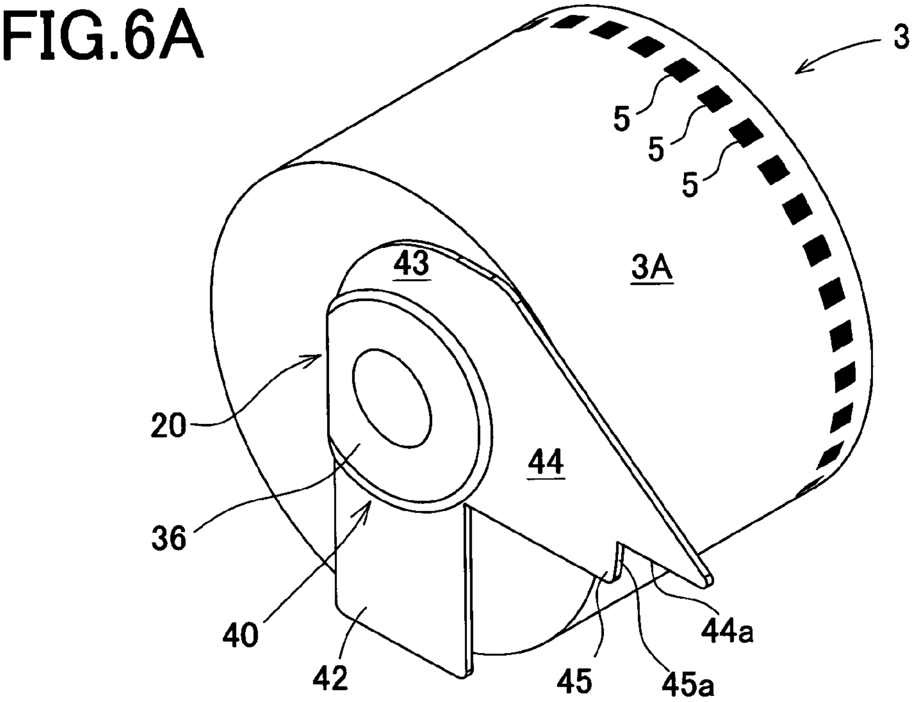
FIG. 6A is a perspective view of a roll sheet holder holding the unfixed-length roll sheet, seen from an obliquely front direction.

As shown in FIG. 6, the roll sheet holder 3 is constructed of the guide member 20, the holding member 12, and a holder shaft 40 of a substantially tube shape. The guide member 20 has a first cylindrical part (not shown) which is fitted in one open end of the sheet core of the roll sheet 3A so that the guide member 20 is held in contact with one of the end faces of the roll sheet 3A. The holding member 12 has a second cylindrical part (not shown) which is fitted in the other open end of the sheet core so that the holding member 12 is held in contact with the other end face of the roll sheet 3A. The holder shaft 40 has two open ends; the one end is fitted in the first cylindrical part of the guide member 20 and formed with a radially extended flange part 36 fixed onto the outer surface of the guide member 20 and the other end is fixedly fitted in the second cylindrical part of the holding member 12. The holder shaft 40 may be selected from among a plurality of shafts of different lengths to easily provide many kinds of roll sheet holders 3 holding unfixed-length roll sheets 3A or die cut label sheets 3B of different widths.

The guide member 20 further includes a first, second, third, and fourth extended portions 42, 43, 44, and 45. The first extended portion 42 is formed extending downward in a predetermined length from a lower periphery of an outer end face of the first cylindrical part. This first extended portion 42 is fitted in the positioning recess 4A formed in the bottom of the holder storage part 4 so that the lower end surface of the first extended portion 42 is brought in contact with the bottom surface of the positioning recess 4A. The second extended portion 43 is formed extending upward to cover a front quarter round of the end face of the roll sheet 3A. The third extended portion 44 is formed continuously extending from the second extended portion 43 up to near the insertion opening 18 (see FIG. 4) and has an upper edge sloped downward to the front end. This third extended portion 44 further has a lower edge (44*a*) extending horizontally, which is held in contact with the flat portion 21 of the tape printer 1 so that one side edge of the unwound part of the roll sheet 3A is guided along the inner surfaces of the second and third extended portions 43 and 44 up to the insertion opening 18.

The fourth extended portion 45 is formed under the third extended portion 44 between the rear end of the lower edge 44*a* at a predetermined distance from the front end and the first extended portion 42. When the lower edge 44*a* of the third extended portion 44 is held in contact with the placing portion 21, a front edge (45*a*) of the fourth extended portion 45 is inserted in appropriate one of the second placing grooves 22A to 22D corresponding to the sheet width of the roll sheet 3A set in the sheet holder 3 (see FIG. 4).

The first and second cylindrical parts serve to rotatably support the sheet core around which the roll sheet 3A is wound. The holder shaft 40 may be selected from among a plurality of shafts of different lengths individually corresponding to the lengths of the sheet cores (i.e., the widths of the roll sheets 3A).

The longitudinal mounting piece (positioning rib) 13 is provided protruding outward, at substantially the center of the width of the positioning member 12 in the feeding direction (a lateral direction in FIG. 6B), and extending from an end of the holder shaft 40 in a direction vertical to the axis of the holder shaft 40. This mounting piece 13 is of a substantially rectangular section and a width which becomes smaller in a downward direction so that the mounting piece 13 is fitted in the first positioning groove 16 having a narrower width (in the feeding direction) towards the bottom of the holder support member 15 in the tape printer 1. The protruding distance of the mounting piece 13 is determined to be almost equal to the width (in a direction of the width of the tape printer 1, perpendicular to the feeding direction) of the first positioning groove 16.

The mounting piece 13 of the positioning member 12 is provided, on the lower outer surface, with a guide portion 57 of a square flat plate (about 1.5 mm to 3.0 mm in thickness in the present embodiment) having a larger width than the lower portion of the mounting piece 13 by a predetermined amount (about 1.5 mm to 3.0 mm in the present embodiment) at each side of the lower portion. Accordingly, to mount the roll sheet holder 3 in the tape printer 1, the user inserts the mounting piece 13 from above into the first positioning groove 16 by bringing an inner surface of the guide portion 57 into sliding contact with the outer surface of the holder support member 15. Thus, the roll sheet holder 3 can easily be fitted in place.

The positioning member 12 is designed to have the extended portion 56 extending downward longer by a predetermined length (about 1.0 mm to 2.5 mm in the present embodiment) than the lower end (the first extended portion 42) of the guide member 20. The positioning member 12 is also provided, at the lower end of the extended portion 56, with a sheet discrimination part 60 of a substantially rectangular shape extending inward by a predetermined length at almost right angle to the extended portion 56.

Figure 6B:
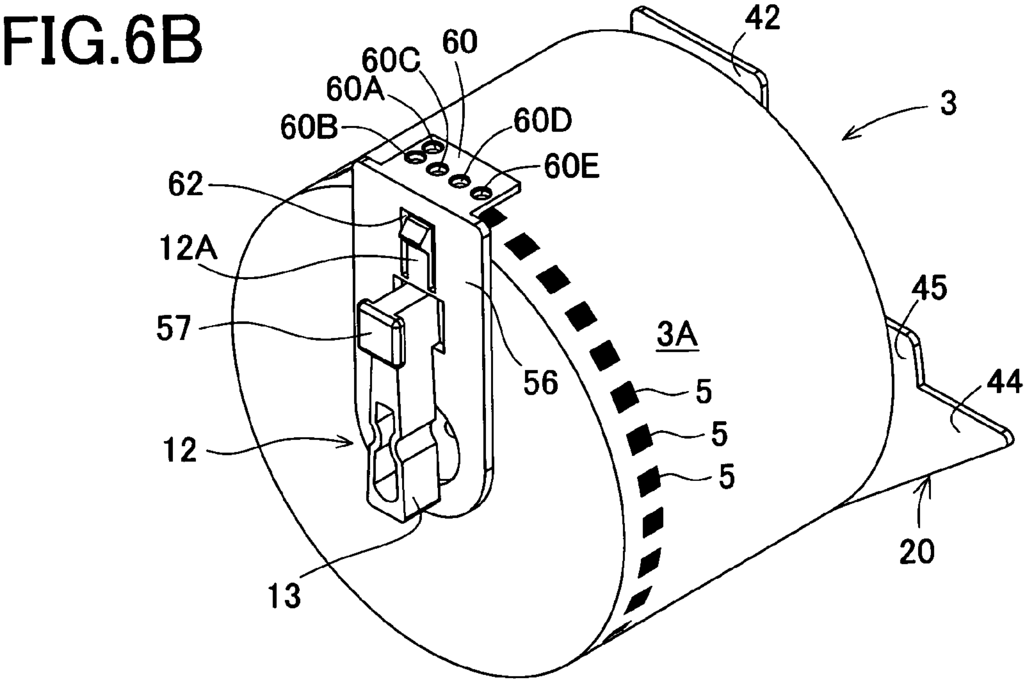
FIG. 6B is a perspective view of the roll sheet holder turned upside down, seen from an obliquely front direction.

As shown in FIG. 6B, as mentioned above, the sheet discrimination part 60 is formed with the sensor holes 60A to 60E arranged at predetermined positions corresponding to the sheet discrimination sensors S1 to S5 respectively, in an L-shaped pattern in the present embodiment. In the present embodiment, the number of the sensor holes is five at the maximum. Specifically, the presence and absence of each hole are allocated "1" and "0" respectively so that the kind of unfixed-length roll sheet 3A or die cut label sheet 3B held in the roll sheet holder 3, the material of the thermal sheet, a width of the roll sheet, a pitch of encoder marks 5 in the feeding direction is represented as five bits.

The positioning member 12 is further formed with a longitudinally rectangular through hole 62 in the extended portion 56 under the mounting piece 13. The elastic locking piece 12A is provided extending downward from the upper edge of the through hole 62 and formed with an outward protrusion at a lower end.

The circuit configuration of tape printer 1 having such structure is explained below by referring to FIG. 7.

Figure 7:
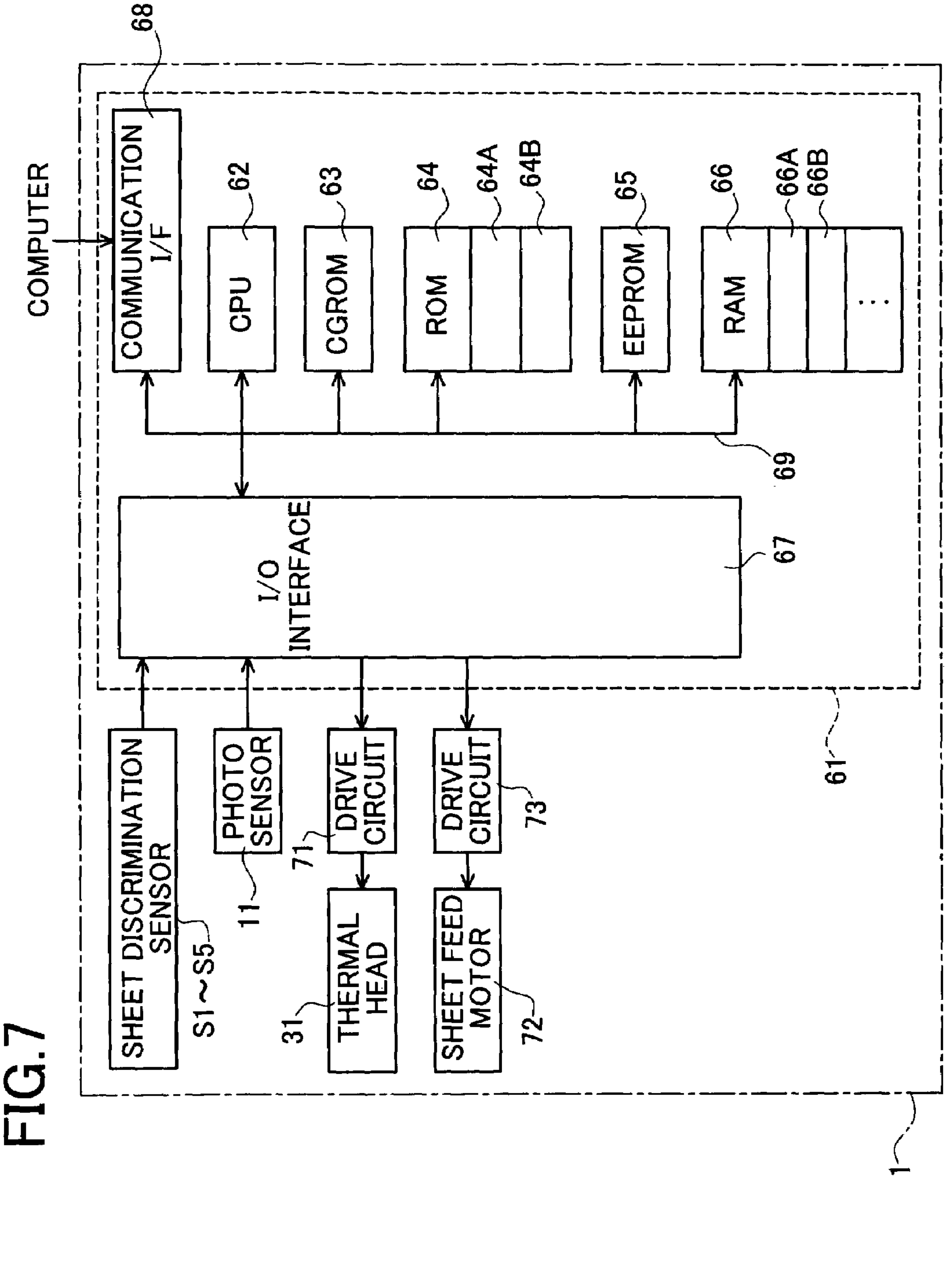
FIG. 7 is a circuit block diagram showing a circuit of a main part of the tape printer in the embodiment.

As shown in FIG. 7, a control circuit 61 formed on a control board 32 of the tape printer 1 includes CPU 62, CG (character generator) ROM 63, ROM 64, flash memory (EEPROM) 65, RAM 66, input/output interface (I/F) 67, communication interface (I/F) 68, and others. Further, CPU 62, CGROM 63, ROM 64, flash memory 65, RAM 66, input/output interface (I/F) 67, and communication interface (I/F) 68 are mutually connected by means of bus line 69, so that data can be exchanged mutually.

In the CG ROM 63, dot pattern data corresponding to each character is stored, and the dot pattern data is read out from the CGROM 63, and the dot pattern is printed on the basis of the dot pattern data on a thermal sheet of unfixed-length roll sheet 3A or die cut label sheet 3B.

Further, the ROM 64 stores various programs, that is, various programs necessary for control of the tape printer 1 such as feeding process programs of unfixed-length roll sheet 3A or die cut label sheet 3B described below. The ROM 64 further includes a mark length output voltage table storage region 64A. The mark length output voltage table storage region 64A stores a mark length output table 75. The mark length output table 75 stores the potential difference of output voltage of photo sensor 11 in the event of change of a width of plural kinds of encoder marks 5 in the feeding direction, and a feeding speed of the unfixed-length roll sheet 3A or die cut label sheet 3B. The ROM 64 moreover includes a roll sheet kind storage region 64B. The roll sheet kind storage region 64B stores kind of unfixed-length roll sheet 3A or die cut label sheet 3B corresponding to each code of 5 bits entered from sheet discrimination sensors S1 to S5, material of thermal sheet, width of roll sheet, feeding direction pitch size of encoder marks 5, and others.

For example, in a roll sheet kind storage region 64B, corresponding to a 5-bit code of 11100 entered from sheet discrimination sensors S1 to S5, kind: unfixed-length roll sheet 3A, material of thermal sheet: material A, roll sheet width: 100 mm, feeding direction pitch size of encoder marks 5: 5 mm are stored. Corresponding to a 5-bit code of 11000, kind: unfixed-length roll sheet 3A, material of thermal sheet: material B, roll sheet width: 100 mm, feeding direction pitch size of encoder marks 5: 5 mm are stored. Corresponding to a 5-bit code of 10110, kind: die cut label sheet 3B, material of thermal sheet: material A, roll sheet width: 100 mm, feeding direction pitch size of encoder marks 5: 5 mm are stored. Corresponding to a 5-bit code of 10100, kind: die cut label sheet 3B, material of thermal sheet: material B, roll sheet width: 100 mm, feeding direction pitch size of encoder marks 5: 5 mm are stored.

In the case of thermal sheet of material A, the maximum feeding speed of thermal sheet that can be printed by way of the thermal head 31 is 80 mm/sec, and the feeding speed of unfixed-length roll sheet 3A using thermal sheet of material A is 80 mm/sec, which is preliminarily stored in the ROM 64. In the case of thermal sheet of material B, the maximum feeding speed of thermal sheet that can be printed by way of the thermal head 31 is 20 mm/sec, and the feeding speed of unfixed-length roll sheet 3A using thermal sheet of material B is 20 mm/sec, which is also preliminarily stored in the ROM 64.

The CPU 62 operates various calculations on the basis of programs stored in the ROM 64. The ROM 64 stores the outline data specifying the outline of each character classified in type style (Gothic, Roman, etc.) corresponding to the code data, in each character of multiple types of characters. According to the outline data, the dot pattern data is developed on a print buffer 66A.

The flash memory 65 stores dot pattern data such as optional font data received from outside computer or other device or dot pattern data such as various pattern data, together with registration numbers, and the contents of storage are supported if the power source of the tape printer 1 is turned off.

The RAM 66 is a temporary storage of various operation results calculated by the CPU 62, and various memories are provided such as print buffer 64A, work region 64B and the like. The print buffer 64A stores dot patterns for printing such a plural characters and symbols, and number of applied pulses as the forming energy quantity of each dot as dot pattern data, and the thermal head 31 prints dots according to the dot pattern data stored in the print buffer 64A.

The input/output interface 67 connects the sheet discrimination sensors S1 to S5, the photo-sensor 11, and a drive circuit 71 for driving the thermal head 31, and a drive circuit 73 for driving a sheet feeding motor 72 to drive and rotate the platen roller 26.

The communication interface 68 is composed of, for example, USB (universal serial bus) or the like, and is connected to an outside computer by means of USB cable or the like, so that two-way data communication is realized.

An example of mark length output voltage table 75 stored in mark length output voltage table storage region 64A of ROM 64 is explained by referring to FIG. 8.

As shown in FIG. 8, the mark length output voltage table 75 comprises "length of black portion of encoder mark (in the unit of mm)" storing the feeding direction width of plural kinds of encoder marks 5, "feeding speed (in the unit of mm/sec)" of plural kinds of unfixed-length roll sheet 3A and die cut label sheet 3B, and potential difference (in the unit of voltage) of high level voltage and low level voltage of output signal of photo sensor 11 corresponding to the combinations of the above numerical data.

In the "length of black portion of encoder mark" in the mark length output voltage table 75, five kinds of length are stored preliminarily, that is, 5 mm, 10 mm, 15 mm, 20 mm, and 25 mm. In the "feeding speed" in the mark length output voltage table 75, five kinds of feeding speed are stored preliminarily, that is, 20 mm/sec, 40 mm/sec, 60 mm/sec, 80 mm/sec, and 100 mm/sec.

For example, in the case of length of black portion of encoder mark of 5 mm and feeding speed of 20 mm/sec, the potential difference of high level voltage and low level voltage of output signal of photo sensor 11 is 2.50 V. In the case of length of black portion of encoder mark of 5 mm and feeding speed of 40 mm/sec, the potential difference of high level voltage and low level voltage of output signal of photo sensor 11 is 2.25 V. In the case of length of black portion of encoder mark of 5 mm and feeding speed of 60 mm/sec, the potential difference of high level voltage and low level voltage of output signal of photo sensor 11 is 2.00 V. In the case of length of black portion of encoder mark of 5 mm and feeding speed of 80 mm/sec, the potential difference of high level voltage and low level voltage of output signal of photo sensor 11 is 1.50 V. In the case of length of black portion of encoder mark of 5 mm and feeding speed of 100 mm/sec, the potential difference of high level voltage and low level voltage of output signal of photo sensor 11 is 1.00 V.

Next, the feeding process of unfixed-length roll sheet 3A or die cut label sheet 3B executed by the tape printer 1 having such configuration is explained below by referring to FIG. 9 to FIG. 11.

Figure 9:
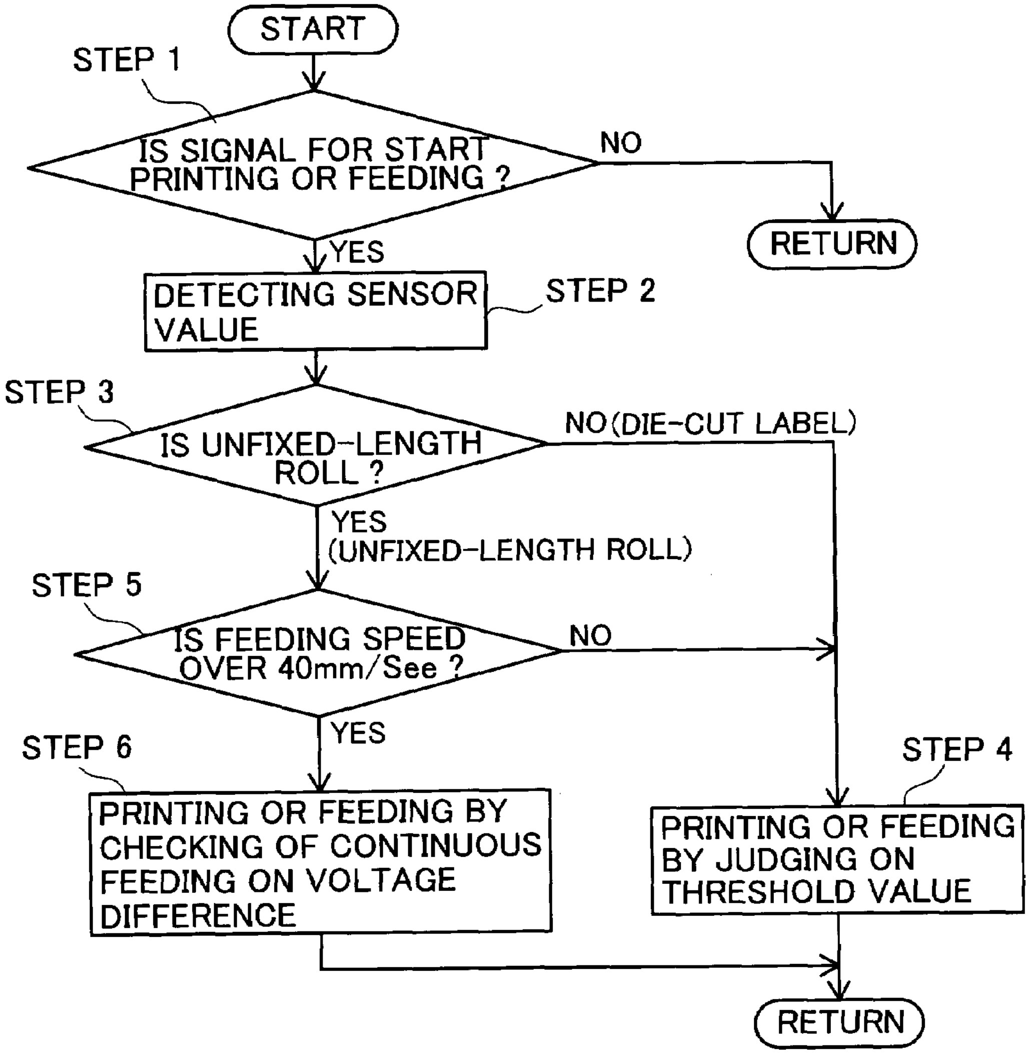
FIG. 9 is a flowchart showing a control process for a mark detection process to detect an encoder mark in the tape printer.

As shown in FIG. 9, at Step 1, the CPU 62 of the tape printer 1 judges presence or absence of input of a print start instruction signal for commanding to print the print data stored in the print buffer 66A by way of the thermal head 31, or feed signal for commanding to feed the leading edge of label 3C of die cut label sheet 3B to the print start position, from the external computer through communication interface (I/F) 68.

In the case of input of a print start instruction signal or feed signal, at Step 2, the CPU 62 reads the 5-bit code entered from sheet discrimination sensors S1 to S5, and stores in the RAM 66.

At Step 3, the CPU 62 reads out this 5-bit code again from the RAM 66, and reads out the data corresponding to this 5-bit code, such as kind of unfixed-length roll sheet 3A or die cut label sheet 3B, material of thermal sheet, width of roll sheet, and feeding direction pitch size of encoder marks 5, from the roll sheet kind storage region 64B, and stores in the RAM 66. The CPU 62 executes a determination process for determining whether unfixed-length roll sheet 3A or die cut label sheet 3B is mounted in the roll sheet holder 3 on the basis of the data stored in the RAM 66 such as kind, material of thermal sheet, width of roll sheet, and feeding direction pitch size of encoder marks 5.

When it is determined that die cut label sheet 3B is mounted in the roll sheet holder 3 (Step 3: NO), at Step 4, the CPU 62 reads out the feeding speed data for die cut label sheet 3B (in this embodiment, the feeding speed for die cut label sheet 3B of 20 mm/sec is preliminarily stored in the ROM 64), and stores in the RAM 66. Further, the CPU 62 reads out the data of feeding direction pitch size of encoder marks 5 again from the RAM 66, and stores the half size of the feeding direction pitch size in the RAM 66 as the feeding direction width data of each encoder mark 5 formed on the back surface of the die cut label sheet 3B. In succession, the CPU 62 reads out, from the RAM 66, each one of feeding speed data and feeding direction width data for die cut label sheet 3B as the data of feeding speed and length of black portion of encoder mark of the mark length output voltage table 75 stored in the mark length output voltage table storage region 64A of the ROM 64 and reads out the corresponding potential difference data (in the unit of V), and stores this potential difference data in the RAM 66.

Again from the RAM 66, the CPU 62 reads out the potential difference data, and stores the low level side voltage of half potential difference of the potential difference data from the predetermined high level voltage (in this embodiment, predetermined high level voltage is 3 V, and predetermined low level voltage is 0 V) of the output signal of the photo sensor 11, as the threshold voltage, in the RAM 66.

For example, in the case the data of feeding direction pitch size of encoder marks 5 being read out from the roll sheet kind storage region 64B and stored in the RAM 66 is 10 mm, the CPU 62 stores 5 mm as the data of feeding direction width of each encoder mark 5 formed on the back surface of the die cut label sheet 3B. The CPU 62 further reads out the feeding speed for die cut label sheet 3B of 20 mm/sec and feeding direction width of encoder marks of 5 mm from the RAM 66, and respectively reads out the corresponding potential difference data of 2.50 V as the data of the feeding speed and length of black portion of encoder mark of mark length output voltage table 75, and stores in the RAM 66.

Figure 10:
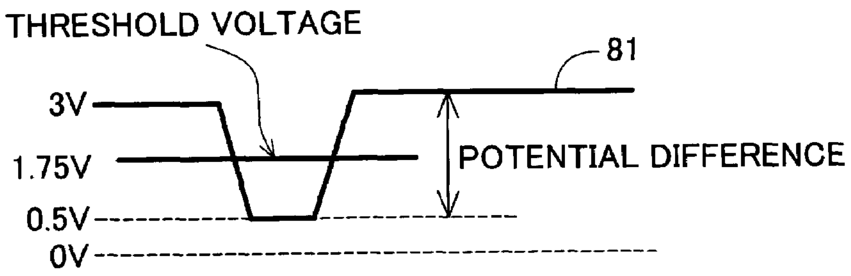
FIG. 10 is an explanatory view showing an example of a threshold voltage of output voltage of a mark detection sensor in the tape printer during feeding at low speed.

Next, as shown in FIG. 10, the CPU 62 reads out this potential difference data of 2.50 V again from the RAM 66, and stores the low level side voltage 1.75 V of half potential difference 1.25 V of the potential difference data 2.50 V from the predetermined high level voltage 3 V of output signal waveform 81 of the photo sensor 11, as the threshold voltage, in the RAM 66.

Consequently, the CPU 62 starts driving of sheet feed motor 72, and rotates platen roller 26, and starts feeding of die cut label sheet 3B at feeding speed of 20 mm/sec. When the voltage of output signal entered from the photo sensor 11 becomes the threshold voltage, the CPU 62 determines that the encoder mark 5 is opposite to the photo sensor 11, and the platen roller 26 is rotated by a predetermined number of revolutions until the label 3C provisionally adhered to the front surface of the die cut label sheet 3B is conveyed to the print start position, and the print data stored in the printing buffer 66A is printed by way of the thermal head 31. After feeding the die cut label sheet 3B by a predetermined length from the moment of the voltage of the output signal entered from the photo sensor 11 reaching the threshold voltage, if the printing output data is still remaining in the printing buffer 66A, the CPU 62 executes the process from STEP 1 again. When the printing output data is not left over in the printing buffer 66A, this process is terminated.

On the other hand, at STEP 3, if it is judged that the unfixed-length roll sheet 3A is mounted in the roll sheet holder 3 (Step 3: YES), at Step 5, the CPU 62 executes a determination process for determining whether the feeding speed of the unfixed-length roll sheet 3A is 40 mm/sec or more or not.

To determine the feeding speed of unfixed-length roll sheet 3A, first, the data of material of thermal sheet stored in the RAM 66 is read out, and the feeding speed corresponding to this material of thermal sheet is read out from the ROM 64, and determined as the feed speed of unfixed-length roll sheet 3A, and stored in the RAM 66.

For example, if the material of the thermal sheet being read out from the RAM 66 is material A, as the feeding speed of unfixed-length roll sheet 3A, 80 mm/sec is read out from the ROM 64, and 80 mm/sec is determined as the feeding speed of unfixed-length roll sheet 3A, and is stored in the RAM 66. If the material of the thermal sheet being read out from the RAM 66 is material B, as the feeding speed of unfixed-length roll sheet 3A, 20 mm/sec is read out from the ROM 64, and 20 mm/sec is determined as the feeding speed of unfixed-length roll sheet 3A, and is stored in the RAM 66.

If the feeding speed of unfixed-length roll sheet 3A is determined to be less than 40 mm/sec (for example, the feeding speed of unfixed-length roll sheet 3A is 20 mm/sec), at Step 4, the CPU 62 reads out the feeding direction pitch size data of encoder marks 5 again from the RAM 66, and stores the half size of the feeding direction pitch size as the feeding direction width data of each encoder mark 5 formed on the back surface of the unfixed-length roll sheet 3A in the RAM 66. Consequently, the CPU 62 reads out, from the RAM 66, each one of feeding speed data and feeding direction width data of unfixed-length roll sheet 3A as the data of feeding speed and length of black portion of encoder mark of the mark length output voltage table 75 stored in the mark length output voltage table storage region 64A of the ROM 64 and reads out the corresponding potential difference data (in the unit of V), and stores this difference potential difference data in the RAM 66.

Again from the RAM 66, the CPU 62 reads out the potential difference data, and stores the low level side voltage of half potential difference of the potential difference data from the predetermined high level voltage (in this embodiment, predetermined high level voltage is 3 V, and predetermined low level voltage is 0 V) of the output signal of the photo sensor 11, as the threshold voltage, in the RAM 66.

For example, in the case the data of feeding direction pitch size of encoder marks 5 being read out from the roll sheet kind storage region 64B and stored in the RAM 66 is 10 mm, the CPU 62 stores 5 mm as the data of feeding direction width of each encoder mark 5 formed on the back surface of the unfixed-length roll sheet 3A. The CPU 62 further reads out the feeding speed of unfixed-length roll sheet 3A of 20 mm/sec and feeding direction width of encoder mark of 5 mm from the RAM 66, and respectively reads out the corresponding potential difference data of 2.50 V as the data of the feeding speed and length of black portion of encoder mark of mark length output voltage table 75, and stores in the RAM 66.

Next, as shown in FIG. 10, the CPU 62 reads out this potential difference data of 2.50 V again from the RAM 66, and stores the low level side voltage 1.75 V of half potential difference 1.25 V of the potential difference data 2.50 V from the predetermined high level voltage 3 V of output signal waveform 81 of the photo sensor 11, as the threshold voltage, in the RAM 66.

Consequently, the CPU 62 starts driving of sheet feed motor 72, and rotates the platen roller 26, and feeds the unfixed-length roll sheet 3A at feeding speed of less than 40 mm/sec (for example, feeding speed of 20 mm/sec), and the printing output data stored in the printing buffer 66A is printed. At the same time, when the voltage of output signal entered from the photo sensor 11 becomes the threshold voltage (for example, the threshold voltage of output signal waveform 81 is 1.75 V as shown in FIG. 10), the CPU 62 determines that the encoder mark 5 is opposite to the photo sensor 11. After a predetermined time (for example, about 0.5 sec later in the case of feeding speed of 20 mm/sec and predetermined pitch of encoder marks 5 of 10 mm), the CPU 62 determines whether the next encoder mark 5 is opposite or not, to check the feeding state (presence or absence of sheet jamming, etc.) of the unfixed-length roll sheet 3A. If the printing output data is still remaining in the printing buffer 66A, the process after STEP 1 is repeated. When the printing output data is not left over in the printing buffer 66A, this process is terminated.

On the other hand, at Step 5, if the feeding speed of unfixed-length roll sheet 3A mounted in the roll sheet holder 3 is determined to be 40 mm/sec or more (for example, the feeding speed of unfixed-length roll sheet 3A is 80 mm/sec), at Step 6, the CPU 62 reads out the feeding direction pitch size data of encoder marks 5 again from the RAM 66, and stores the half size of the feeding direction pitch size as the feeding direction width data of each encoder mark 5 formed on the back surface of the unfixed-length roll sheet 3A in the RAM 66. Consequently, the CPU 62 reads out, from the RAM 66, each one of feeding speed data and feeding direction width data of unfixed-length roll sheet 3A from the data of feeding speed and length of black portion of encoder mark of the mark length output voltage table 75 stored in the mark length output voltage table storage region 64A of the ROM 64 and reads out the corresponding potential difference data (in the unit of V), and stores this potential difference data in the RAM 66.

For example, in the case the data of feeding direction pitch size of encoder marks 5 being read out from the roll sheet kind storage region 64B and stored in the RAM 66 is 10 mm, the CPU 62 stores 5 mm as the data of feeding direction width of each encoder mark 5 formed on the back surface of the unfixed-length roll sheet 3A. The CPU 62 further reads out the feeding speed of unfixed-length roll sheet 3A of 80 mm/sec and feeding direction width of each encoder mark of 5 mm from the RAM 66, and respectively reads out the corresponding potential difference data of 1.50 V as the data of the feeding speed and length of black portion of encoder mark of mark length output voltage table 75, and stores the potential difference data 1.50 V in the RAM 66.

Consequently, the CPU 62 starts driving of sheet feed motor 72, and rotates the platen roller 26, and feeds the unfixed-length roll sheet 3A at feeding speed of 40 mm/sec or more (for example, feeding speed of 80 mm/sec), and the printing output data stored in the printing buffer 66A is printed. At the same time, the CPU 62 reads out the potential difference data from the RAM 66 again, and when the voltage of output signal entered from the photo sensor 11 is changed to the predetermined low level voltage side by the potential difference portion of the potential difference data from the predetermined high level voltage (in this embodiment, the predetermined high level voltage is 3 V, and predetermined low level voltage is 0 V), that is, when voltage of output signal entered from the photo sensor 11 becomes a voltage lower by potential difference portion of the potential difference data, the CPU 62 determines that the encoder mark 5 is opposite to the photo sensor 11. After a predetermined time (for example, about ⅛ sec later in the case of feeding speed of 80 mm/sec and predetermined pitch of encoder marks 5 of 10 mm), the CPU 62 determines whether the next encoder mark 5 is opposite or not, to check the feeding state (presence or absence of sheet jamming, etc.) of the unfixed-length roll sheet 3A.

Figure 11:
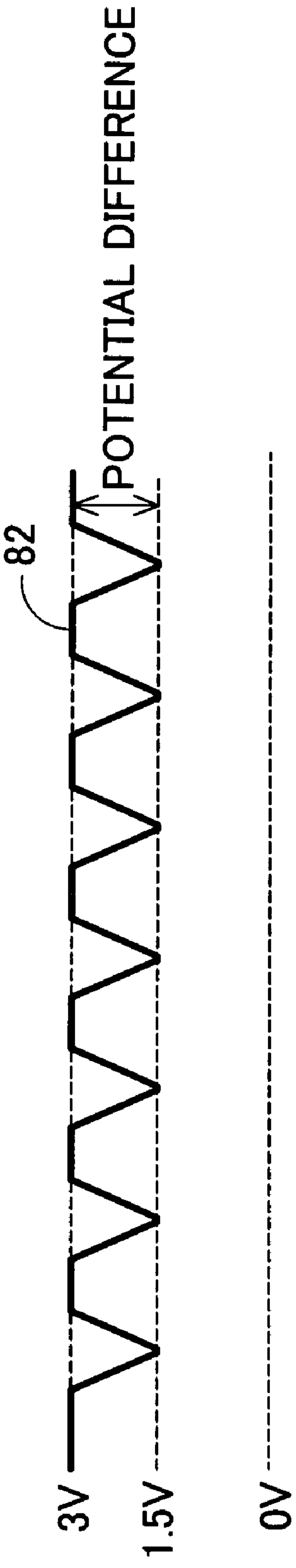
FIG. 11 is an explanatory view showing an example of a potential difference of output voltage of the mark detection sensor during feeding at high speed.
Figure 12:
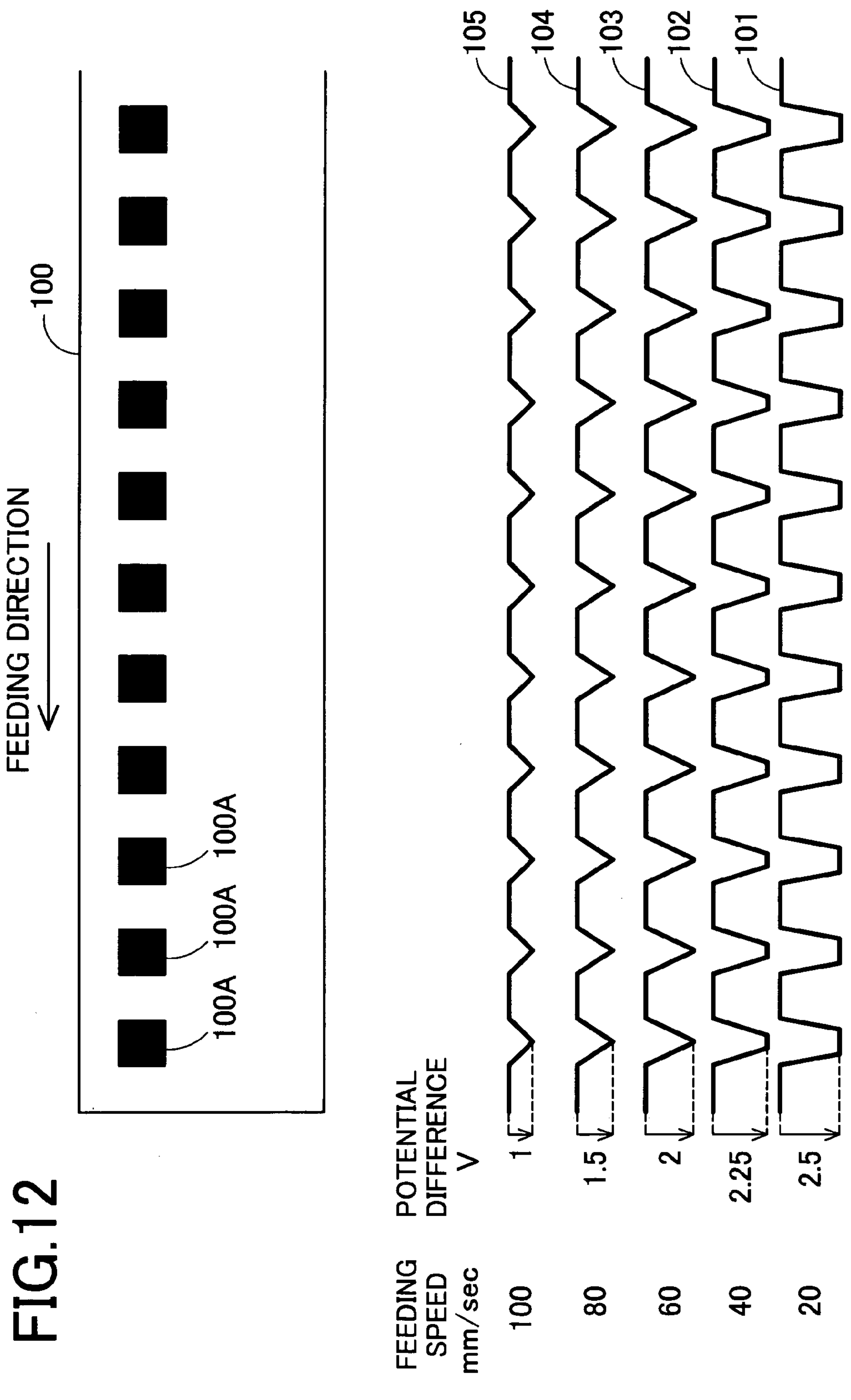
FIG. 12 is an explanatory view showing an example of a relationship between the output voltage of the mark detection sensor and the feeding speed for the unfixed-length roll sheet in a tape printer in a prior art.

For example, as shown in FIG. 11, in the case the potential difference data being read out from the RAM 66 is 1.50 V, when the voltage of the output signal waveform 82 of the photo sensor 11 is changed to the low level voltage side by the potential difference portion of potential difference data 1.50 V from the predetermined high level voltage of 3 V, that is, when becoming 3 V−1.50 V=1.50 V, the CPU 62 determines that the encoder mark 5 is opposite to the photo sensor 11. After a predetermined time (for example, about ⅛ sec later in the case of feeding speed of 80 mm/sec and predetermined pitch of encoder marks 5 of 10 mm), the CPU 62 determines whether the next encoder mark 5 is opposite or not, to check the feeding state (presence or absence of sheet jamming, etc.) of the unfixed-length roll sheet 3A.

If the printing output data is still remaining in the printing buffer 66A, the process after STEP 2 is repeated. When the printing output data is not left over in the printing buffer 66A, this process is terminated.

Herein, the platen roller 26, sheet feed motor 72, and drive circuit 73 compose the feeding device. The thermal head 31 and drive circuit 71 compose the printing device. The photo sensor 11 functions as a mark detection sensor. The sheet discrimination sensors S1 to S5 compose the kind detecting device.

The CPU 62, ROM 64, and RAM 66 compose the control device. The mark length output voltage table storage region 64A composes the output voltage storage section. The ROM 64 functions as feeding speed storage device.

Therefore, in the tape printer 1 of the embodiment, when the die cut label sheet 3B is mounted in the roll sheet holder 3, by detection of threshold voltage of output signal of the photo sensor 11, each label 3C provisionally adhered to the surface side of the die cut label sheet 3B is fed up to the print start position, or when the unfixed-length roll sheet 3A is mounted in the roll sheet holder 3, the feeding state of the unfixed-length roll sheet 3A is judged on the basis of the threshold voltage of output signal of the photo sensor 11 or voltage change of predetermined potential difference portion of the photo-sensor 11.

As a result, each encoder mark 5 formed on the back surface of die cut label sheet 3B and unfixed-length roll sheet 3A can be securely detected by the same photo sensor 11. In the case of die cut label sheet 3B, the label 3C of die cut label sheet 3B can be fed to the print start position. In the case of unfixed-length roll sheet 3A, the feeding state of unfixed-length roll sheet 3A can be judged correctly.

Even if plural kinds of die cut label sheet 3B are mounted in the roll sheet holder 3, the label of each kind of die cut label sheet 3B can be fed to the print start position at the maximum feeding speed capable of detecting the threshold voltage of output signal of the photo sensor 11 and the feeding speed of the die cut label sheet 3B can be increased. The encoder marks 5 formed in plural kinds of die cut label sheet 3B can be securely detected by the same photo-sensor 11 and the number of parts can be curtailed and the manufacturing cost can be reduced.

If the predetermined feeding speed of the unfixed-length roll sheet 3A is less than 40 mm/sec, the CPU 62 determines that the encoder mark 5 is opposite to the photo sensor 11 when the output voltage of the photo sensor 11 is at predetermined threshold. Therefore the predetermined pitch of encoder marks 5 can be shortened in the case of the feeding speed of less than 40 mm/sec, and feeding troubles can be detected more promptly. In the case of the predetermined feeding speed of the unfixed-length roll sheet 3A of 40 mm/sec or more, the CPU 62 determines that the encoder mark 5 is opposite to the photo sensor 11 when the output voltage of the photo sensor 11 is changed by the predetermined potential difference portion. Thus, the encoder mark 5 can be securely detected by the same photo sensor 11 to judge the feeding state even in the case of fast feeding, and therefore the number of parts can be curtailed and the manufacturing cost can be lowered.

Moreover, since the encoder marks 5 are formed in half size of predetermined pitch in the width in the feeding direction, the waveform of output signal of the photo sensor 11 can be easily formed in square wave, and even if the waveform of output signal of the photo sensor 11 is sawtooth wave, the potential difference of output signal can be detected securely.

The invention is not limited to this embodiment alone, but may be changed and modified in various manners within the scope not departing from the true spirit of the invention.

Second Embodiment

For example, in the above tape printer, it may be configured such that the control device (e.g., CPU 62) includes output signal judging device for judging if the output signal issued from the mark detection sensor (e.g., photo-sensor 11) is square wave or not. In the case the roll sheet is unfixed-length roll sheet, when the output signal judging device judges that the output signal is square wave, the control device determines that the encoder mark (e.g., encoder mark 5) is opposite to the mark detection sensor when the output voltage of the mark detection sensor becomes the predetermined threshold, thereby judging the feeding state of the unfixed-length sheet. On the other hand, when the output signal judging device does not judge that the output signal is square wave, the control device determines that the encoder mark is opposite to the mark detection sensor when the output voltage of the mark detection sensor is changed by the predetermined voltage change portion, thereby judging the feeding state of the unfixed-length roll sheet.

Thus, it is not necessary to store the feeding speed preliminarily about each one of plural kinds of unfixed-length roll sheet, so that the memory capacity can be curtailed.

Third Embodiment

For example, the tape printer may be configured as below. The control device (e.g., CPU 62) includes output signal judging device for judging if the output signal issued from the mark detection sensor (e.g., photo-sensor 11) is square wave or not. In the case the roll sheet is unfixed-length roll sheet, when the output signal judging device judges that the output signal is square wave, the control device determines that the encoder mark is opposite (e.g., encoder mark 5) to the mark detection sensor when the output voltage of the mark detection sensor becomes the predetermined threshold, thereby judging the feeding state of the unfixed-length sheet. When the output signal judging device does not judge that the output signal is square wave, the control device determines that the encoder mark is opposite to the mark detection sensor when the output voltage of the mark detection sensor is changed by the predetermined voltage change portion, thereby judging the feeding state of the unfixed-length roll sheet.

Further, in the case the roll sheet is die cut label sheet, when the output signal judging device judges that the output signal is square wave, the control device determines that the encoder mark is opposite to the mark detection sensor when the output voltage of the mark detection sensor becomes the predetermined threshold, thereby feeding the label of the die cut label sheet to the print start position. When the output signal judging device does not judge that the output signal is square wave, the control device determines that the encoder mark is opposite to the mark detection sensor when the output voltage of the mark detection sensor is changed by the predetermined voltage change portion, thereby feeding the label of the die cut label sheet to the print start position.

Thus, it is not necessary to store the feeding speed preliminarily about each one of plural kinds of unfixed-length roll sheet, so that the memory capacity can be curtailed. For each of plural kinds of die cut label sheet, even if the feeding speed is changed, the encoder mark can be detected securely by way of the mark detection sensor, so that the feeding speed of die cut label sheet can be increased.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A tape printer comprising:

a feeding device for pulling out and feeding a long roll sheet wound in a rolled state so that a back surface is outside, the roll sheet having encoder marks formed at predetermined pitch on the back surface, and comprising one of:

a die cut label sheet having plural labels provisionally adhered to a front surface of a long release sheet arranged along the longitudinal direction of the release sheet, and an unfixed-length roll sheet formed by winding a long continuous printing medium;

a printing device for printing on the roll sheet being fed by the feeding device;

a mark detection sensor for detecting the encoder marks and issuing one of a plurality of output voltages unique to the detected encoder marks;

sheet discrimination sensors for detecting the kind of the roll sheet; and a control circuit for controlling the feeding device on the basis of the one output voltage issued from the mark detection sensor, the control circuit including:

an output voltage storage section storing the plurality of output voltages of the mark detection sensor corresponding to each combination of length of plural kinds of encoder marks in a feeding direction and a feeding speed of plural kinds of roll sheets; and a controller programmed to:

determine the kind of the roll sheet detected by the sheet discrimination sensors;

feed the label of the die cut label sheet to a print start position on the basis of the output voltage of the mark detection sensor in the case where the roll sheet is the die cut label sheet; and judge a feeding state of the unfixed-length roll sheet based on the one output voltage of the mark detection sensor in the case where the roll sheet is the unfixed-length roll sheet.

2. The tape printer according to claim 1, wherein the controller is programmed to:

feed the label of the die cut label sheet to the print start position by determining that the encoder mark is opposite to the mark detection sensor when the one output voltage of the mark detection sensor becomes a predetermined threshold in the case where the roll sheet is die cut label sheet.

3. The tape printer according to claim 2, wherein the encoder marks are provided so as to be opposite to an end edge of a feeding direction side of each label and also opposite to the mark detection sensor in the case where the roll sheet is the die cut label sheet.

4. The tape printer according to claim 3, wherein the control circuit includes:

a feeding speed storage section preliminarily storing a predetermined feeding speed corresponding to each kind of roll sheet, and a reference speed storage section storing a first speed as a reference feeding speed; and the controller being programmed to:

determine whether the predetermined feeding speed is less than the first speed or not in the case where the roll sheet is the unfixed-length roll sheet, check a first feeding state of the unfixed-length roll sheet by determining that the encoder mark is opposite to the mark detection sensor when the one output voltage of the mark detection sensor becomes the predetermined threshold if the predetermined feeding speed is less than the first speed, and check a second feeding state of the unfixed-length roll sheet by determining that the encoder mark is opposite to the mark detection sensor when the one output voltage of the mark detection sensor is changed by a predetermined voltage if the predetermined feeding speed is not less than the first speed.

5. The tape printer according to claim 4, wherein a width of the encoder marks in the feeding direction is set to be half of the predetermined pitch in the case where the roll sheet is the unfixed-length roll sheet.

6. The tape printer according to claim 1, wherein the encoder marks are provided so as to be opposite to an end edge of a feeding direction side of each label and also opposite to the mark detection sensor in the case where the roll sheet is the die cut label sheet.

7. The tape printer according to claim 6, wherein the control circuit includes:

a feeding speed storage section preliminarily storing a predetermined feeding speed corresponding to each kind of roll sheet, and a reference speed storage section storing a first speed as a reference feeding speed; and the controller being programmed to:

determine whether the predetermined feeding speed is less than the first speed or not in the case where the roll sheet is the unfixed-length roll sheet, check a first feeding state of the unfixed-length roll sheet by determining that the encoder mark is opposite to the mark detection sensor when the one output voltage of the mark detection sensor becomes the predetermined threshold if the predetermined feeding speed is less than the first speed, and check a second feeding state of the unfixed-length roll sheet by determining that the encoder mark is opposite to the mark detection sensor when the one output voltage of the mark detection sensor is changed by a predetermined voltage if the predetermined feeding speed is not less than the first speed.

8. The tape printer according to claim 7, wherein a width of the encoder marks in the feeding direction is set to be half of the predetermined pitch in the case where the roll sheet is the unfixed-length roll sheet.

9. The tape printer according to claim 1, wherein the control circuit includes:

a feeding speed storage section preliminarily storing a predetermined feeding speed corresponding to each kind of roll sheet, and a reference speed storage section storing a first speed as a reference feeding speed; and the controller being programmed to:

determine whether the predetermined feeding speed is less than the first speed or not in the case where the roll sheet is the unfixed-length roll sheet, check a first feeding state of the unfixed-length roll sheet by determining that the encoder mark is opposite to the mark detection sensor when the one output voltage of the mark detection sensor becomes the predetermined threshold if the predetermined feeding speed is less than the first speed, and check a second feeding state of the unfixed-length roll sheet by determining that the encoder mark is opposite to the mark detection sensor when the one output voltage of the mark detection sensor is changed by a predetermined voltage if the predetermined feeding speed is not less than the first speed.

10. The tape printer according to claim 9, wherein a width of the encoder marks in the feeding direction is set to be half of the predetermined pitch in the case where the roll sheet is the unfixed-length roll sheet.

11. The tape printer according to claim 1, wherein a width of the encoder marks in the feeding direction is set to be half of the predetermined pitch in the case where the roll sheet is the unfixed-length roll sheet.

12. A tape printer comprising:

a feeding device for pulling out and feeding a long roll sheet wound in a rolled state so that a back surface is outside, the roll sheet having encoder marks formed at predetermined pitch on the back surface, and comprising one of a die cut label sheet having plural labels provisionally adhered to a front surface of a long release sheet arranged along the longitudinal direction of the release sheet; and an unfixed-length roll sheet formed by winding a long continuous printing medium;

a printing device for printing on the roll sheet being fed by the feeding device;

a mark detection sensor for detecting the encoder marks and issuing one of a plurality of output voltages unique to the detected encoder mark;

sheet discrimination sensors for detecting the kind of the roll sheet; and a control circuit for controlling the feeding device on the basis of the one output voltage issued from the mark detection sensor, the control circuit including:

an output voltage storage section storing the plurality of output voltages of the mark detection sensor corresponding to each combination of length of plural kinds of encoder marks in the feeding direction and a feeding speed of plural kinds of roll sheets, a feeding speed storage section preliminarily storing a predetermined feeding speed corresponding to each kind of roll sheet;

a reference speed storage section storing a first speed as a reference feeding speed; and a controller programmed to:

determine the kind of the roll sheet detected by the sheet discrimination sensors;

feed the label of the die cut label sheet to a print start position by determining that the encoder mark is opposite to the mark detection sensor when the one output voltage of the mark detection sensor becomes the predetermined threshold in the case where the roll sheet is the die cut label sheet;

determine whether the predetermined feeding speed is less than the first speed or not in the case where the roll sheet is the unfixed-length roll sheet;

check a first feeding state of the unfixed-length roll sheet by determining that the encoder mark is opposite to the mark detection sensor when the one output voltage of the mark detection sensor becomes the predetermined threshold if the predetermined feeding speed is less than the first speed; and check a second feeding state of unfixed-length roll sheet by determining that the encoder mark is opposite to the mark detection sensor when the one output voltage of the mark detection sensor is changed by a predetermined voltage if the predetermined feeding speed is not less than the first speed.

13. A tape printer comprising:

a feeding device for pulling out and feeding a long roll sheet wound in a rolled state so that a back surface is outside, the roll sheet having encoder marks formed at predetermined pitch on the back surface, and comprising one of:

a die cut label sheet having plural labels provisionally adhered to a front surface of a long release sheet arranged along the longitudinal direction of the release sheet; and an unfixed-length roll sheet formed by winding a long continuous printing medium;

a printing device for printing on the roll sheet being fed by the feeding device;

a mark detection sensor for detecting the encoder marks and issuing one of a plurality of output voltages unique to the detected encoder mark;

sheet discrimination sensors for detecting the kind of the roll sheet; and a control circuit for controlling the feeding device on the basis of the one output voltage issued from the mark detection sensor, the control circuit including:

an output voltage storage section storing the plurality of output voltages of the mark detection sensor corresponding to each combination of length of plural kinds of encoder marks in the feeding direction and a feeding speed of plural kinds of roll sheets;

a feeding speed storage section preliminarily storing a predetermined feeding speed corresponding to each kind of roll sheet, a reference speed storage section storing a first speed as a reference feeding speed; and a controller programmed to:

determine the kind of the roll sheet detected by the sheet discrimination sensors;

feed the label of the die cut label sheet to a print start position by determining that the encoder mark is opposite to the mark detection sensor when the one output voltage of the mark detection sensor becomes the predetermined threshold in the case where the roll sheet is the die cut label sheet;

determine whether the predetermined feeding speed is less than the first speed or not in the case where the roll sheet is the unfixed-length roll sheet;

check a first feeding state of the unfixed-length roll sheet by determining that the encoder mark is opposite to the mark detection sensor when the one output voltage of the mark detection sensor becomes the predetermined threshold if the predetermined feeding speed is less than the first speed; and check a second feeding state of unfixed-length roll sheet by determining that the encoder mark is opposite to the mark detection sensor when the one output voltage of the mark detection sensor is changed by a predetermined voltage if the predetermined feeding speed is not less than the first speed; and a width of encoder marks in the feeding direction being to be half of the predetermined pitch in the case where the roll sheet is the unfixed-length roll sheet.

14. A tape printer comprising:

a feeding device for pulling out and feeding a long roll sheet wound in a rolled state so that a back surface is outside, the roll sheet having encoder marks formed at predetermined pitch on the back surface, and comprising one of:

a die cut label sheet having plural labels provisionally adhered to a front surface of a long release sheet arranged along the longitudinal direction of the release sheet, and an unfixed-length roll sheet formed by winding a long continuous printing medium;

a printing device for printing on the roll sheet being fed by the feeding device;

a mark detection sensor for detecting the encoder marks and issuing one of a plurality of output voltages unique to the detected encoder mark;

sheet discrimination sensors for detecting the kind of the roll sheet; and a control circuit for controlling the feeding device on the basis of the one output voltage issued from the mark detection sensor, the control circuit including:

an output voltage storage section storing the plurality of output voltages of the mark detection sensor corresponding to each combination of length of plural kinds of encoder marks in the a feeding direction and feeding speed of plural kinds of roll sheets;

a feeding speed storage section preliminarily storing a predetermined feeding speed corresponding to each kind of roll sheet;

a reference speed storage section storing a first speed as a reference feeding speed; and a controller programmed to:

determine the kind of the roll sheet detected by the sheet discrimination sensors;

feed the label of the die cut label sheet to a print start position by determining that the encoder mark is opposite to the mark detection sensor when the one output voltage of the mark detection sensor becomes the predetermined threshold in the case where the roll sheet is the die cut label sheet;

determine whether the predetermined feeding speed is less than the first speed or not in the case where the roll sheet;

check a first feeding state of the unfixed-length roll sheet by determining that the encoder mark is opposite to the mark detection sensor when the one output voltage of the mark detection sensor becomes the predetermined threshold if the predetermined feeding speed is less than the first speed, and check a second feeding state of unfixed-length roll sheet by determining that the encoder mark is opposite to the mark detection sensor when the one output voltage of the mark detection sensor is changed by a predetermined voltage portion if the predetermined feeding speed is not less than the first speed;

the encoder marks being provided so as to be opposite to an end edge of the feeding direction side of each label and also opposite to the mark detection sensor in the case where the roll sheet is the die cut label sheet; and a width of encoder marks in the feeding direction being set to be half of the predetermined pitch in the case where the roll sheet is the unfixed-length roll sheet.

* * * * *